3,223,714
PROCESS OF PRODUCING FURAN

Donald G. Manly, Barrington, and Joseph P. O'Halloran, Cary, Ill., assignors to The Quaker Oats Company, Chicago, Ill., a corporation of New Jersey
No Drawing. Filed May 22, 1963, Ser. No. 282,221
4 Claims. (Cl. 260—346.1)

This invention relates to a low pressure vapor phase process for the conversion of furfural to furan; and more specifically, to the continuous low pressure vapor phase decarbonylation of furfural in the presence of hydrogen and a supported palladium catalyst.

In 1952 H. E. Eschinazi (Bulletin de la Societe Chemique, 5th Series, vol. 19, pages 967–969) described a process for the liquid phase decarbonylation of furfural by boiling liquid furfural in the presence of palladium on a sodium carbonate treated barium sulfate support. In this description Eschinazi refers to a preceding publication [J.A.C.S. 73[3], pp. 5651–54 (1952)] for the method used in preparing the catalyst.

In U.S. Patent No. 3,007,941, which relates to the liquid phase decarbonylation of furfural, H. B. Copelin et al. report that "research studies have confirmed the findings of H. E. Eschinazi." In this patent Copelin et al. also refer to the use of a palladium catalyst for the decarbonylation of furfural, and they refer to production rate studies, which they extrapolate to infinite time to obtain numbers called "extrapolated catalyst productivity". The productivity thus hypothesized, however, would be produced for the large part at rates which are a small fraction of the initial high rate. In Example 3 of the Copelin et al. patent the production rate drops from 375 grams furan/gram palladium per hour to 12% of that value in 120 hours. How much of the furan was produced at a diminished rate, e.g. below 50% of the initial rate, cannot be calculated from the data reported. It is clear that the hypothetical furan which would have been produced, had the test actually been continued, would have been produced at a rate lower than 12% of the initial production rate. It is also clear, by definition, that in order to achieve the hypothetical 21,000 grams of furan per gram palladium reported in Example 3 of the Copelin et al. patent, the experiment would have had to be continued to the end of time, i.e. "to infinite time."

It is an object of the present invention to provide a process for production of furan which provides high productivity at production rates which are close to the high initial rate of production.

Another object of this invention is to produce furan from furfural in a low pressure vapor phase process which avoids gradual buildup of acidic material and sludge associated with continuous long-term boiling of liquid furfural.

A further object of the present invention is to provide a vapor phase process of producing furan from furfural in which substantially quantitative conversions and very high yields are achieved.

An important object of this invention is to provide a process for producing furan in which the catalyst can be regenerated conveniently in place.

These and other objects which will be apparent hereinafter are obtained in accordance with this invention by a continuous low pressure vapor phase process comprising contacting furfural vapor with a supported palladium catalyst at a temperature between about 200° C. and about 350° C., said contacting taking place in the presence of hydrogen in an amount of at least 0.3 mole per mole of furfural vapor contacted, said supported palladium catalyst providing a pH of at least about 8.

In the process of this invention temperatures of between about 290° C. and 310° C. are preferred. Hydrogen to furfural molar ratios of 2:1 and higher in the feed gas are also effective though ratios that high are unnecessary. It is preferred that hydrogen be present in an amount between 0.5 and 2.0 moles per mole furfural contacted, and more preferably in an amount of about 1 mole per mole of furfural contacted. If furfural vapor is contacted with the catalyst under conditions of this invention except that less than a 0.3:1 molar ratio of hydrogen:furfural is used, short productivity results, as is illustrated in Example 14 below.

Any conventional catalyst support may be used in the process of this invention provided the supported catalyst gives a pH value greater than about 8. Examples of conventional supports are barium sulfate, alumina, calcium carbonate, diatomaceous earth, silica gel, carbon, etc. Obviously, carbon would not be selected as the support for catalysts intended for reuse after oxygen "burn-off" regeneration. Many conventional catalyst supports are neutral or acidic in their purest form. Nonetheless, as indicated above, these supports may be used as supports for the catalyst of this invention provided the pH value of the supported catalyst is greater than about 8. The alkaline character of the supported catalyst may be achieved by use of an akaline support, or it may be achieved by the use of alkaline materials in preparation of the catalyst, e.g., the use of a base to precipitate palladium hydroxide on the support, or it may be achieved by washing the supported catalyst with an alkaline solution. Examples of such alkaline solutions are solutions of sodium hydroxide, sodium silicate, potassium carbonate, etc. An example of a suitable procedure for achieving alkalinity in a supported palladium catalyst is reported by H. E. Eschinazi in the references cited above. Here Eschinazi teaches the use of sodium carbonate to precipitate palladium on a neutral-type support (barium-sulfate). Catalysts prepared in this manner are entirely suitable for the process of this solution.

A preferred catalyst has 0.3% by weight palladium on alumina. The concentration of palladium in prepared catalysts is normally about 10% by weight or below. However, the concentration of the palladium is not critical. A preferred form of catalyst is a ⅛″ pellet.

The procedure by which the catalyst is prepared is not critical, provided the supported catalyst has the required pH. Hence it is clear that anyone skilled in the art can readily devise a host of alternate procedures for preparing catalysts for use in the process of this invention.

To determine the pH value of a support or supported catalyst as referred to herein the following procedure is used: A sample of the support or supported catalyst is finely ground. Three grams of this finely ground material is admixed with 50 ml. of neutral water. The resulting slurry is stirred with a motor-driven stirrer for 15 minutes. The pH of the slurry is then determined with a pH meter and is reported as the pH value of the sample.

Atmospheric pressures are eminently satisfactory in the process of this invention. Subatmospheric pressures (e.g., 0.8 atmosphere) as well as pressures up to above five atmospheres are effective also. Higher pressures have some utility but are much less effective. Pressures between about one atmosphere and two atmospheres are preferred. Slightly elevated pressures aid in recovery of the product.

The process of this invention affords long catalyst life (productivity) at high rates of conversion. The "life" or "productivity" term, as used herein, is defined as the number of units of weight of furan produced per unit weight of palladium in the supported palladium catalyst under test conditions described in Example 8 below, before conversion drops below 80%. The "conversion," as used herein, is the percent by weight of furfural which is used up in reaction. The examples below report production rates of from about 100 to about 400 pounds furan per hour per pound of palladium. Moreover, in Examples 8 and 13 below production lives of catalysts were 9,500 and 16,500 pounds per pound of catalyst, respectively, before the conversion dropped to below 80% of initial rate, and before the first regeneration of the catalyst. Moreover, as Example 9 illustrates, the catalyst was regenerated in place conveniently by conventional oxygen "burn-off" technique. Examples 9 and 10 report trials in which accumulated productivity or life of about 35,000 grams furan per gram palladium were achieved, utilizing only three regenerations. All of this cumulative actual production (i.e., 35,000 grams furan per gram palladium) was produced at a rate not less than 80% of the initial rate. In addition, as reported in Example 12, we have discovered that an ammonia treatment after the burn-off significantly enhances the subsequent activity and productivity of the catalyst. The improved method for regenerating a palladium catalyst comprises the following steps: (1) burning off combustible impurities by contacting the catalyst with an oxygen-containing gas at a temperature below about 500° C., (2) contacting the resulting catalyst with ammonia gas, and (3) flushing unreacted ammonia from the catalyst by means of a gas sweep.

The invention will be further illustrated but not limited by the following examples in which quantities stated are in parts by weight and percent by weight unless otherwise indicated. Percent yields given are percent of the theoretical yield based on conversion.

Example 1

A catalyst in the form of palladium-alumina ⅛" pellets, having a ratio by weight of $Al_2O_3$:Pd of 99.7:0.3, was charged to a jacketed steel reactor tube. The reactor tube was placed in a hermetically joined series of units comprising a hydrogen preheater, a furfural vaporizer, the reactor tube, product condenser, product tank, refrigerated tanks and a vent. The pressure on the system was essentially atmospheric pressure throughout this test. The entire system was flushed with hydrogen, and the reactor and contents were heated to 300° C. (as measured in the catalyst bed). Hydrogen gas was then fed via the furfural vaporizer into the reactor. Furfural was also fed via the vaporizer at such a rate that the gas going into the reactor had a hydrogen:furfural molar ratio of 1:1. Furfural in an amount of 233 pounds was fed per hour per pound of palladium. One hundred percent of the furfural was converted. Including furan recovered from the refrigerated system, the yields were between 95 and 100%, and the conversion and yield were substantially constant over a period of 28 hours.

Example 2

The procedure of Example 1 was repeated except that the hydrogen to furfural molar ratio was 11:1, which ratio is outside the scope of this invention. Considerable tetrahydrofuran was formed, and the yield of furan was only about 70%. The conversion of furfural was 94%.

Example 3

The procedure of Example 1 was repeated except that, contrary to this invention, no hydrogen was used. Instead of hydrogen, nitrogen was used at a 1:1 molar ratio of nitrogen to furfural. The yield of furan was 68%. The conversion was 76%.

Example 4

The procedure of Example 1 was repeated except that, contrary to this invention, the temperature was 175° C. The yield of furan was 59%. The conversion was only 63%.

Example 5

The procedure of Example 1 was repeated except that, contrary to this invention, the contacting temperature was 375° C. The yield of furan was 32%. Conversion was 100%. The major by-products were noncondensable gas products.

Example 6

The procedure of Example 1 was repeated except that 0.3% palladium on charcoal was employed at a temperature of 350° C. A 100% conversion of furfural and and 89% yield of furan were obtained. The major by-products were noncondensed gas products.

Example 7

Catalyst (0.3% palladium on alumina gel) in an amount of 150 grams was charged to a tubular reactor as in Example 1. As in Example 1, hydrogen was introduced through the furfural vaporizer. Furfural was fed to the vaporizer at a rate of 41 grams per hour along with sufficient hydrogen to a give a hydrogen to furfural molar ratio of about 2:1. The rest of the reaction and recovery system was essentially the same as that described in Example 1. When the reaction was carried out under these conditions at a contacting temperature of 300° C., more than 99% of the furfural was converted to provide 98% yield of furan and about 2% yield of methylfuran.

Example 8

Three grams of ⅛" pellets of a catalyst (0.3% palladium on alumina) were ground with a mortar and pestle and then placed in 50 ml. of neutral water. The resulting slurry was stirred with a motor-driven stirrer. The pH of the slurry was determined at 15 minutes after the slurry was placed in the water. In this particular case the pH of the slurry was 8.38. Yields of 95–100% were obtained and a productivity of about 9500 grams of furan per gram of palladium was achieved before conversion dropped below 80%.

The high productivity (life) of the catalyst under the conditions of this invention makes it inconvenient to determine the productivity of a large number of catalysts in standard process equipment. Hence an accelerated procedure was devised. In this procedure, the combination of high furfural feed rate (550 grams furfural per gram palladium per hour) and small bed weight (0.075 gram of supported palladium) makes it possible to determine the productivity value within several days by running 24 hours per day. This accelerated procedure was used to determine productivity in the examples herein. The procedure is as follows:

Sufficient supported catalyst to provide 0.075 gram palladium is placed vertically in a thermostatically controlled electric tube furnace and hermetically joined to a system comprising a hydrogen line, a constant feed pump, the reactor, a graduated glass vessel, refrigerated furan traps, and a vent. Hydrogen is swept through the system at atmospheric pressure and the reactor is heated to 300° C. Liquid furfural is fed via the constant feed pump and is allowed to drop onto a thick wad of glass wool at the top of the catalyst bed. The glass wool serves as a vaporizer and helps to mix the furfural vapor with the hydrogen gas which is also introduced at the top of the reactor. Furfural is fed at the rate of about 16 grams per hour or about 550 grams per hour per gram palladium. Hydrogen flow is controlled at one mole per mole of furfural fed. After flowing through the catalyst bed, the vapor stream flows through an air-cooled, graduated glass vessel and then into a system of Dry Ice-acetone refrigerated traps. While 100% conversion of the furfural is achieved by this procedure, nothing is collected in the air-cooled, graduated glass vessel, and the product furan is recovered in the refrigerated trap. After a time, the conversion no longer is 100%, and furfural begins to appear in the graduated glass vessel. The decrease in conversion rate is determined by plotting the volume of the furfural in the graduated glass receiver each hour on graph paper. Hence when the furfural is collected at the rate of 1.10 ml. per hour, conversion is at 80%. If the yields are substantially quantitative, the weight of the furan may be estimated by subtracting the weight of furfural in the graduated glass receiver trap from the weight of furfural fed into the system throughout the reaction period, and multiplying the difference by 0.71, since $$\frac{\text{M.W. furan}}{\text{M.W. furfural}} = 0.71$$

Productivity may then be calculated from the following formula:

$$\frac{\text{Wgt. furan produced}}{\text{Wgt. catalyst} \times \text{percent Pd in catalyst}} =$$

$$\frac{\text{grams furan}}{\text{grams Pd in catalyst}} = \text{productivity}$$

*Example 9*

Immediately after the conversion provided by the catalyst bed of Example 8 dropped below 80%, hydrogen and furfural were discontinued and the system was flushed with nitrogen. Oxygen was then introduced with nitrogen at such a rate that the catalyst bed temperature was maintained below 500° C. After the "burning off" appeared to move through the bed, the amount of oxygen was gradually increased until pure oxygen was swept over the bed. Care was taken to avoid temperatures over 500° C. The temperature was returned to 300° C., and after the system was swept with nitrogen the hydrogen flow was resumed and the productivity determined as in Example 8 above. The accumulated productivity after three consecutive "productivity" determinations (including two "burning off" regeneration procedures) was about 23,000 grams furan per gram palladium for this bed.

*Example 10*

After the third productivity determination on the bed referred to in Example 9 above, the "burning off" or regeneration procedure was repeated again (for the third time) except that before hydrogen was reintroduced, ammonia gas was swept through the bed for one hour. The ammonia was then flushed from the system by a one-hour hydrogen sweep. The productivity was again determined and was found to be about 12,000 grams furan per gram of palladium.

Hence, the accumulated productivity of this bed (Examples 8, 9 and 10) was 35,000 grams furan per gram palladium at this point. Note that the "initial" productivity of this bed (Example 8) prior to first regeneration was 9,500 grams furan per gram of palladium. It is emphasized that these productivity determinations are based on furan produced before the conversion dropped to below 80%. The furan yields achieved throughout Examples 8, 9 and 10 were about 95% or better.

*Example 11*

Two different 0.3% palladium on alumina catalysts were tested for pH and productivity by the procedures of Example 8. One supported catalyst gave a pH value of 5.2. The other supported catalyst gave a pH value of 7.2. It is clear from the disclosure herein that supported alumina catalysts having pH values such as these are not suitable catalysts for this invention. The productivity tests on these catalysts gave results of zero and 700 grams furan per gram palladium, respectively.

*Example 12*

Another palladium on alumina catalyst containing 0.3% palladium gave a pH of 9.7 and a productivity (before regeneration) of about 13,000 grams furan per gram palladium when tested according to the procedures of Example 8.

*Example 13*

A different portion of the same catalyst used in Example 8 was washed with a 10% sodium silicate solution and dried in air at 110° C. for two hours. The dried catalyst was tested for pH value and productivity as in Example 8. A pH value of 11.5 and a productivity of 16,500 grams furan per gram palladium were obtained.

*Example 14*

A 0.3% palladium on alumina catalyst was evaluated as in Example 8 for pH and for productivity, with the exception, contrary to this invention, that no hydrogen was employed in the productivity test procedure. A pH of 8.6 and a productivity of substantially zero were obtained.

*Example 15*

About 149 grams of catalyst (0.3% palladium on alumina gel) were charged to an iron tube laboratory reactor. The reactor was hermetically joined to a system comprising a hydrogen feed line, furfural liquid feed line, the reactor, a product condenser and a product receiver. The reactor and contents were heated to 300° C. ±5° C. Hydrogen was fed at a rate of six liters per hour. Furfural liquid was fed directly onto the top of the catalyst at the rate of about 25 grams per hour. The reaction was carried out intermittently under these conditions for several days. On the seventh day, the product was sampled for a two-and-one-half-hour period for analysis. About 61 grams furfural were fed during this sample period in which 42 grams of product were recovered, 1.3 grams being furfural. Distillation and analysis of the distilled product by vapor phase chromatography indicated that about forty grams of furan had been produced and recovered. This constitutes 93% yield, based on the furfural converted.

Note that no furfural vaporizer was used in Example 15. It illustrates the extent to which furfuan is produced by the process of this invention even though provisions for good mixing of the hydrogen and furfural vapor are lacking. In this example the liquid furfural is converted rapidly to vapor since the reactor is maintained at a temperature far above the boiling point of furfural. However, the use of a separate furfural vaporizer and a well-mixed hydrogen-furfural vapor gas stream are preferred.

*Example 16*

Equipment substantially the same as that used in Example 1 was used in this test except that the vent was pressure regulated so that a relatively high pressure of 75 p.s.i.g. was maintained on the system, contrary to this invention. The catalyst of Example 1 was utilized. The system was brought to 75 p.s.i.g. with carbon monoxide, the catalyst bed was brought to 220° C., and furfural was fed into the vaporizer at the rate of 0.5 part per part catalyst. No additional carbon monoxide was introduced to the reactor, other than that which was formed by the reaction itself. No hydrogen was introduced to the reactor, contrary to this invention. Only about 1250 parts of furan per part palladium were produced before the conversion dropped to 90%. Yields of 93–95% were obtained throughout the test.

*Example 17*

The procedure of Example 16 was repeated except that a temperature of 300° C. was utilized. The results obtained were substantially the same as those obtained in Example 16.

*Example 18*

The procedure of Example 16 was repeated except that (1) the system was pressurized with hydrogen instead of carbon monoxide, (2) hydrogen was swept into the vaporizer throughout this test at the rate of 0.5 mole per mole of furfural, and (3) 0.42 part furfural per part catalyst was fed per hour. As in Example 16 the high pressure was employed, contrary to this invention, About 3,200 parts furan were produced per part of palladium before the conversion dropped throughout this test. Yields of 93–95% were obtained throughout this test.

A comparision of the productivities obtained in Example 16 and Example 8 clearly shows the unexpected superiority of the process of this invention employing substantially atmospheric pressure conditions. A comparison of Example 1 and Example 3 clearly illustrates the necessity of hydrogen in the process of this invention.

The process of this invention provides high productivity at production rates which are close to the high initial rate of production. It provides substantially quantitative conversion and very high yields of furan.

We claim:

1. A continuous low pressure vapor phase process for the production of furan comprising contacting furfural vapor with a supported palladium catalyst at a temperature between about 200° C. and about 350° C., said contacting taking place in the presence of hydrogen in an amount of at least 0.3 mole per mole of furfural vapor contacted, said supported palladium catalyst providing a pH of at least about 8.

2. A process as in claim 1, in which said contacting takes place in the presence of hydrogen in an amount of about 1 mole per mole of furfural contacted, and at a temperature between about 290° C. and about 310° C.

3. A process as in claim 2 in which said contacting takes place at between about 1 atmosphere and about 2 atmospheres pressure.

4. A continuous low pressure vapor phase process for the production of furan comprising contacting furfural vapor with a supported palladium catalyst at a temperature between about 200° and about 350° C., said contacting taking place at about one atmosphere pressure in the presence of hydrogen in an amount between 0.5 and 2 moles per mole furfural vapor contacted, said contacting taking place at a pressure up to about five atmospheres, said supported palladium catalysts providing a pH of at least about 8.

References Cited by the Examiner

UNITED STATES PATENTS

| | | | |
|---|---|---|---|
| 2,776,981 | 1/1957 | Tyran | 260—346.1 |
| 2,993,910 | 7/1961 | Dimroth et al. | 260—346.1 |
| 3,007,941 | 11/1961 | Copelin et al. | 260—346.1 |
| 3,046,235 | 7/1962 | King et al. | 252—411 |
| 3,071,551 | 1/1963 | Robinson et al. | 252—411 |

NICHOLAS S. RIZZO, *Primary Examiner.*

UNITED STATES PATENT OFFICE
CERTIFICATE OF CORRECTION

Patent No. 3,223,714　　　　　　　　　　　　　　December 14, 1965

Donald G. Manly et al.

It is hereby certified that error appears in the above numbered patent requiring correction and that the said Letters Patent should read as corrected below.

Column 2, line 39, for "solution" read -- invention --; column 4, line 14, strike out "and"; column 6, line 41, for "furfuan" read -- furan --; column 7, line 5, for "invention," read -- invention. --; line 7, for "throughout this test." read -- to below 81.5%. --.

Signed and sealed this 4th day of October 1966.

(SEAL)
Attest:

ERNEST W. SWIDER　　　　　　　　　　　　　　EDWARD J. BRENNER
Attesting Officer　　　　　　　　　　　　　　　　Commissioner of Patents